US012366666B2

(12) United States Patent
Grgich et al.

(10) Patent No.: US 12,366,666 B2
(45) Date of Patent: Jul. 22, 2025

(54) SYSTEMS AND METHODS FOR REDUCED-OUTLIER SATELLITE POSITIONING

(71) Applicant: Swift Navigation, Inc., San Francisco, CA (US)

(72) Inventors: Paul Grgich, San Francisco, CA (US); Matt Peddie, San Francisco, CA (US)

(73) Assignee: Swift Navigation, Inc., San Francisco, CA (US)

(*) Notice: Subject to any disclaimer, the term of this patent is extended or adjusted under 35 U.S.C. 154(b) by 323 days.

(21) Appl. No.: 18/117,197

(22) Filed: Mar. 3, 2023

(65) Prior Publication Data

US 2023/0204795 A1 Jun. 29, 2023

Related U.S. Application Data

(63) Continuation of application No. 16/748,517, filed on Jan. 21, 2020, now Pat. No. 11,624,843, which is a
(Continued)

(51) Int. Cl.
*G01S 19/40* (2010.01)
*G01S 19/20* (2010.01)
(Continued)

(52) U.S. Cl.
CPC .............. *G01S 19/40* (2013.01); *G01S 19/20* (2013.01); *G01S 19/42* (2013.01); *G06F 17/18* (2013.01)

(58) Field of Classification Search
CPC ........... G01S 19/40; G01S 19/20; G01S 19/42
(Continued)

(56) References Cited

U.S. PATENT DOCUMENTS

| 5,610,614 A | 3/1997 | Talbot et al. |
| 6,278,945 B1 | 8/2001 | Lin |

(Continued)

FOREIGN PATENT DOCUMENTS

| AU | 2007300586 A1 | 4/2008 |
| CA | 2718988 C | 1/2014 |

(Continued)

OTHER PUBLICATIONS

International Search Report and Written Opinion for PCT Application No. PCT/US20/44750 mailed Jan. 8, 2021.
(Continued)

*Primary Examiner* — Harry K Liu
(74) *Attorney, Agent, or Firm* — Jeffrey Schox; Randy Mehlenbacher

(57) ABSTRACT

A method for reduced-outlier satellite positioning includes receiving a set of satellite positioning observations at a receiver; generating a first receiver position estimate; generating a set of posterior observation residual values from the set of satellite positioning observations and the first receiver position estimate; based on the set of posterior observation residual values, identifying a subset of the satellite positioning observations as statistical outliers; and after mitigating an effect of the statistical outliers, generating a second receiver position estimate having higher accuracy than the first receiver position estimate.

22 Claims, 3 Drawing Sheets

Related U.S. Application Data continuation of application No. 16/219,119, filed on Dec. 13, 2018, now Pat. No. 10,578,747.

(60) Provisional application No. 62/598,826, filed on Dec. 14, 2017.

(51) Int. Cl.
  *G01S 19/42* (2010.01)
  *G06F 17/18* (2006.01)

(58) Field of Classification Search
  USPC .................................................. 342/357.27
  See application file for complete search history.

(56) References Cited

U.S. PATENT DOCUMENTS

| | | | |
|---|---|---|---|
| 6,317,688 B1 | 11/2001 | Bruckner et al. |
| 6,427,122 B1 | 7/2002 | Lin |
| 6,453,237 B1 | 9/2002 | Fuchs et al. |
| 6,552,680 B1 | 4/2003 | Barber et al. |
| 6,647,340 B1 | 11/2003 | Pemble et al. |
| 6,691,066 B1 | 2/2004 | Brodie |
| 6,753,810 B1 | 6/2004 | Yang et al. |
| 6,816,117 B2 | 11/2004 | Fink et al. |
| 6,856,905 B2 | 2/2005 | Pasturel et al. |
| 6,864,836 B1 | 3/2005 | Hatch et al. |
| 7,026,982 B2 | 4/2006 | Toda et al. |
| 7,219,013 B1 | 5/2007 | Young et al. |
| 7,289,061 B2 | 10/2007 | Komjathy et al. |
| 7,292,183 B2 | 11/2007 | Bird et al. |
| 7,298,325 B2 | 11/2007 | Krikorian et al. |
| 7,382,313 B1 | 6/2008 | Goad |
| 7,409,289 B2 | 8/2008 | Coatantiec et al. |
| 7,538,721 B2 | 5/2009 | Vollath et al. |
| 7,692,578 B2 | 4/2010 | Vollath et al. |
| 7,696,922 B2 | 4/2010 | Nicholson et al. |
| 8,089,402 B2 | 1/2012 | Maenpa et al. |
| 8,094,065 B2 | 1/2012 | Henkel |
| 8,193,976 B2 | 6/2012 | Shen et al. |
| 8,255,155 B1 | 8/2012 | Crane et al. |
| 8,416,133 B2 | 4/2013 | Hatch et al. |
| 8,447,517 B2 | 5/2013 | Roh |
| 8,542,146 B2 | 9/2013 | Vollath |
| 8,587,475 B2 | 11/2013 | Leandro |
| 8,610,624 B2 | 12/2013 | Savoy |
| 8,756,001 B2 | 6/2014 | Georgy et al. |
| 8,760,343 B2 | 6/2014 | Milyutin et al. |
| 8,825,456 B2 | 9/2014 | Vasudevan et al. |
| 8,860,609 B2 | 10/2014 | Roh |
| 8,996,311 B1 | 3/2015 | Morin et al. |
| 9,031,782 B1 | 5/2015 | Lemay et al. |
| 9,069,073 B2 | 6/2015 | Ramakrishnan et al. |
| 9,128,176 B2 | 9/2015 | Seeger |
| 9,182,497 B2 | 11/2015 | Geier et al. |
| 9,405,012 B2 | 8/2016 | Doucet et al. |
| 9,405,016 B2 | 8/2016 | Yim |
| 9,417,330 B2 | 8/2016 | Revol et al. |
| 9,488,734 B2 | 11/2016 | Davain |
| 9,557,422 B1 | 1/2017 | Miller et al. |
| 9,568,321 B2 | 2/2017 | Bharadwaj et al. |
| 9,576,082 B2 | 2/2017 | Sparks et al. |
| 9,602,974 B2 | 3/2017 | Rudow et al. |
| 9,612,341 B2 | 4/2017 | Large et al. |
| 9,671,501 B2 | 6/2017 | Leandro et al. |
| 9,709,683 B2 | 7/2017 | Leandro et al. |
| 9,784,844 B2 | 10/2017 | Kana et al. |
| 9,857,474 B2 | 1/2018 | Tan et al. |
| 9,927,530 B2 | 3/2018 | Boyarski |
| 9,933,528 B2 | 4/2018 | Horn et al. |
| 10,018,729 B2 | 7/2018 | Dunik et al. |
| 10,101,464 B2 | 10/2018 | Appleford et al. |
| 10,191,157 B2 | 1/2019 | Dai et al. |
| 10,260,888 B2 | 4/2019 | Takahashi |
| 10,267,924 B2 | 4/2019 | Ramanandan et al. |
| 10,274,606 B1 | 4/2019 | Phan et al. |
| 10,393,879 B2* | 8/2019 | Saito ................ G01S 19/071 |
| 10,422,885 B2 | 9/2019 | Dai et al. |
| 10,459,593 B2 | 10/2019 | Tiwari et al. |
| 10,578,747 B2 | 3/2020 | Grgich et al. |
| 10,677,933 B1 | 6/2020 | Gavrilets et al. |
| 10,802,160 B2 | 10/2020 | Dai et al. |
| 10,809,388 B1 | 10/2020 | Carcanague et al. |
| 10,901,096 B2 | 1/2021 | Thrasher et al. |
| 11,156,718 B2 | 10/2021 | Takeda |
| 11,187,813 B2 | 11/2021 | Brandl et al. |
| 11,237,276 B2 | 2/2022 | Kleeman |
| 11,259,141 B2 | 2/2022 | Li et al. |
| 11,327,182 B2 | 5/2022 | Zalewski et al. |
| 11,422,269 B2 | 8/2022 | Ookubo et al. |
| 11,422,271 B2 | 8/2022 | Talbot et al. |
| 11,860,287 B2 | 1/2024 | Angelo et al. |
| 2002/0180641 A1 | 12/2002 | Fink et al. |
| 2005/0001762 A1 | 1/2005 | Han et al. |
| 2005/0001763 A1 | 1/2005 | Han et al. |
| 2005/0024263 A1 | 2/2005 | Sharpe et al. |
| 2005/0114023 A1 | 5/2005 | Williamson et al. |
| 2007/0126629 A1 | 6/2007 | Krikorian et al. |
| 2008/0205521 A1 | 8/2008 | Van |
| 2009/0018772 A1 | 1/2009 | Watanabe et al. |
| 2009/0184869 A1 | 7/2009 | Talbot et al. |
| 2009/0224969 A1 | 9/2009 | Kolb |
| 2009/0262013 A1 | 10/2009 | Vollath |
| 2009/0273511 A1 | 11/2009 | Schroth |
| 2010/0033370 A1 | 2/2010 | Lopez et al. |
| 2010/0164789 A1 | 7/2010 | Basnayake |
| 2010/0283675 A1 | 11/2010 | McAree et al. |
| 2011/0050497 A1 | 3/2011 | Maenpa et al. |
| 2011/0090116 A1 | 4/2011 | Hatch et al. |
| 2011/0122022 A1 | 5/2011 | Van et al. |
| 2011/0140959 A1 | 6/2011 | Vollath |
| 2011/0148698 A1 | 6/2011 | Vollath |
| 2011/0187589 A1 | 8/2011 | Gaal et al. |
| 2011/0187590 A1 | 8/2011 | Leandro |
| 2011/0316740 A1 | 12/2011 | Waters et al. |
| 2012/0154210 A1 | 6/2012 | Landau et al. |
| 2012/0176271 A1 | 7/2012 | Dai et al. |
| 2013/0050020 A1 | 2/2013 | Peck et al. |
| 2013/0099967 A1 | 4/2013 | Ramasubramanian et al. |
| 2013/0099970 A1 | 4/2013 | Lin et al. |
| 2013/0227377 A1 | 8/2013 | Rao et al. |
| 2013/0234885 A1 | 9/2013 | Geier et al. |
| 2013/0265191 A1 | 10/2013 | Ghinamo |
| 2013/0271318 A1 | 10/2013 | Landau et al. |
| 2013/0335264 A1 | 12/2013 | Revol et al. |
| 2014/0015712 A1 | 1/2014 | Leandro et al. |
| 2014/0062765 A1 | 3/2014 | Brenner |
| 2014/0184442 A1 | 7/2014 | Large et al. |
| 2014/0232592 A1 | 8/2014 | Psiaki et al. |
| 2014/0240172 A1 | 8/2014 | Milyutin et al. |
| 2014/0266876 A1 | 9/2014 | Tan et al. |
| 2014/0375495 A1 | 12/2014 | Fleming et al. |
| 2015/0019464 A1 | 1/2015 | Nguyen-Tuong et al. |
| 2015/0173037 A1 | 6/2015 | Pijl |
| 2015/0260848 A1 | 9/2015 | Mundt et al. |
| 2015/0270615 A1 | 9/2015 | Neenan |
| 2015/0293230 A1 | 10/2015 | Weed et al. |
| 2015/0293233 A1 | 10/2015 | De Jong |
| 2015/0369924 A1 | 12/2015 | Hedgecock et al. |
| 2016/0011318 A1 | 1/2016 | Cohen |
| 2016/0097859 A1 | 4/2016 | Hansen et al. |
| 2016/0195617 A1 | 7/2016 | Phatak et al. |
| 2017/0269216 A1 | 9/2017 | Dai et al. |
| 2017/0269222 A1 | 9/2017 | Dai et al. |
| 2017/0269231 A1 | 9/2017 | Dai et al. |
| 2017/0299730 A1 | 10/2017 | Lie et al. |
| 2017/0299731 A1 | 10/2017 | Lie et al. |
| 2017/0322313 A1 | 11/2017 | Revol et al. |
| 2018/0113219 A1 | 4/2018 | Wuebbena |
| 2018/0120445 A1 | 5/2018 | Dill |
| 2018/0164442 A1 | 6/2018 | Thrasher et al. |
| 2018/0172838 A1 | 6/2018 | Junker et al. |
| 2018/0246217 A1 | 8/2018 | Wuebbena |
| 2018/0252818 A1 | 9/2018 | Sato et al. |

(56) References Cited

U.S. PATENT DOCUMENTS

| | | | |
|---|---|---|---|
| 2018/0283882 | A1 | 10/2018 | He et al. |
| 2018/0299562 | A1 | 10/2018 | Green |
| 2018/0306930 | A1 | 10/2018 | Laine et al. |
| 2019/0004180 | A1 | 1/2019 | Jokinen |
| 2019/0154837 | A1 | 5/2019 | Noble et al. |
| 2019/0187295 | A1 | 6/2019 | Lee et al. |
| 2019/0187298 | A1 | 6/2019 | Grgich et al. |
| 2019/0204450 | A1 | 7/2019 | Revol |
| 2019/0243001 | A1 | 8/2019 | Ookubo et al. |
| 2019/0302274 | A1 | 10/2019 | Berntorp et al. |
| 2019/0339396 | A1 | 11/2019 | Turunen |
| 2019/0383948 | A1 | 12/2019 | Hoeferlin et al. |
| 2020/0025936 | A1 | 1/2020 | Zhou et al. |
| 2020/0025937 | A1 | 1/2020 | Kroeger et al. |
| 2020/0041654 | A1 | 2/2020 | Noble et al. |
| 2020/0096649 | A1 | 3/2020 | Brandl et al. |
| 2020/0209406 | A1 | 7/2020 | Lin et al. |
| 2020/0233056 | A1 | 7/2020 | Dolgov et al. |
| 2020/0257002 | A1 | 8/2020 | Henkel |
| 2020/0348422 | A1 | 11/2020 | Carcanague et al. |
| 2021/0026374 | A1 | 1/2021 | Burghardt et al. |
| 2021/0033735 | A1 | 2/2021 | Kleeman |
| 2021/0116579 | A1 | 4/2021 | Rezaei |
| 2021/0165104 | A1 | 6/2021 | Zalewski et al. |
| 2021/0165111 | A1 | 6/2021 | Zalewski |
| 2021/0215831 | A1 | 7/2021 | Takeda |
| 2021/0372793 | A1 | 12/2021 | Nikulin et al. |
| 2022/0058322 | A1 | 2/2022 | Brandl et al. |
| 2022/0107427 | A1 | 4/2022 | Kleeman et al. |
| 2022/0163677 | A1 | 5/2022 | Muthuraman et al. |
| 2022/0171053 | A1 | 6/2022 | Park et al. |
| 2023/0280476 | A1 | 9/2023 | Reimer et al. |

FOREIGN PATENT DOCUMENTS

| | | |
|---|---|---|
| CA | 3079279 A1 | 10/2020 |
| CN | 101166995 A | 4/2008 |
| CN | 103197327 A | 7/2013 |
| CN | 103760573 A | 4/2014 |
| CN | 104236522 A | 12/2014 |
| CN | 104732085 A | 6/2015 |
| CN | 106970404 A | 7/2017 |
| CN | 108196272 A | 6/2018 |
| CN | 108317949 A | 7/2018 |
| CN | 108536003 A | 9/2018 |
| CN | 105629263 B | 4/2019 |
| CN | 107422354 B | 6/2019 |
| CN | 111879545 A | 11/2020 |
| CN | 109714421 B | 8/2021 |
| CN | 114174850 A | 3/2022 |
| DE | 102017212603 A1 | 1/2019 |
| EP | 0244091 A2 | 11/1987 |
| EP | 1729145 A1 | 12/2006 |
| EP | 2128841 A1 | 12/2009 |
| EP | 2602752 A1 | 6/2013 |
| EP | 1839070 B2 | 4/2014 |
| EP | 2966477 A1 | 1/2016 |
| EP | 3627188 A1 | 3/2020 |
| EP | 3566021 B1 | 3/2021 |
| EP | 3963352 A1 | 3/2022 |
| KR | 101181990 B1 | 9/2012 |
| WO | 02061449 A1 | 8/2002 |
| WO | 2017046914 A1 | 3/2017 |
| WO | 2017070732 A1 | 5/2017 |
| WO | 2018188845 A1 | 10/2018 |
| WO | 2020240307 A1 | 12/2020 |

OTHER PUBLICATIONS

International Search Report and Written Opinion for PCT Application No. PCT/US20/31137 mailed Sep. 4, 2020.
"An Introduction to GNSS, Chapter 4, GNSS Error Sources", https://novatel.com/an-introduction-to-gnss/chapter-4-gnsserrorsources, published 2015.
"Geo++ SSR For Network—RTK, PPP and PPP-RTK", https://geopp.de/wp-content/uploads/2020/09/SSR_Flyer_v3.pdf, Sep. 2015.
"IGS State Space Representation (SSR) Format Version 1.00", International GNSS Service (IGS), Oct. 5, 2020.
"Integrity—Navipedia", https://gssc.esa.int/navipedia/index.php/Integrity, published 2011.
"Phase II of the GNSS Evolutionary Architecture Study", https://www.faa.gov/about/office_org/headquarters_offices/ato/service_units/techops/navservices/gnss/library/documents/media/geasphaseii_final.pdf, Feb. 2010.
"RAIM", GMV, 2011, RAIM.
"Safe Position Augmentation for Real-Time Navigation (SPARTN) Interface Control Document Version 1.8.0", Jan. 2020, Sapcorda Services GmbH.
"Swift Navigation Binary Protocol", Version 3.4.5, Mar. 10, 2021, pp. 1-156.
Altmayer, Christian, "Cycle Slip Detection and Correction by Means of Integrated Systems", ION Institute of Navigation, Proceedings of the 200 National Technical Meeting of the Institute of Navigation, Abstract, Jan. 26-28, 2000.
Berntorp, Karl, et al., "Bayesian Sensor Fusion of GNSS and Camera With Outlier Adaptation for Vehicle Positioning", Mitsubishi Electric Research Laboratories, https://www.merl.com, Aug. 6, 2022.
Blanch, Juan, et al., "RAIM with Optimal Integrity and Continuity Allocations Under Multiple Failures", IEEE Transactions on Aerospace and Electronic Systems, vol. 46, No. 3, Jul. 2010.
Brack, A., "Optimal Estimation of a Subset of Integers With Application to GNSS", Artificial Satellites, vol. 51, No. 4—2016 DOI: 10.1515/arsa-2016-0011.
Brocard, Philippe, "Integrity monitoring for mobile users in urban environment", https://tel.archives-ouvertes.fr/tel-01379632/document, submitted Oct. 11, 2016.
Bruno, Jon, et al., "A realistic simulation framework to evaluate ionospheric tomography", Advances in Space Research 65 (2020) 891-901.
Cassel, Ryan, "Real-Time ARAIM Using GPS, GLONASS, and GALILEO", Submitted in partial fulfillment of the requirements for the degree of Master of Science in Mechanical and Aerospace Engineering in the Graduate College of the Illinois Institute of Technology, May 2017.
Chiu, David S., et al., "Bierman-Thorton UD Filtering for Double-Differenced Carrier Phase Estimation Accounting for Full Mathematical Correlation", Jan. 2008, ION NTM 2008, pp. 756-762., Jun. 23, 2017 00:00:00.0.
Davidson, Pavel, et al., "Improved Vehicle Positioning in Urban Environment through Integration of GPS and Low-Cost Inertial Sensors", European Navigation Conference, ENC-GNSSAt: Naples, Italy, May 2009.
Drescher, Ralf, "Fast convergence of Trimble CenterPoint RTX by regional augmentation", Trimble Terrasat GmbJ, Munich, EGU General Assembly 2015, Vienna, Thursday, Apr. 16, 2015.
Favey, Etienne, et al., "Dead reckoning fills-in GPS navigation gap", EE Times, Automotive Designline, Aug. 18, 2011.
Feng, Shaun, et al., "Carrier phase-based integrity monitoring for high-accuracy positioning", GPS Solution, Apr. 2009.
Gratton, Livio, et al., "Carrier Phase Relative RAIM Algorithms and Protection Level Derivation", Journal of Navigation (2010), 63, 215-231, doi: 10.1017/S0373463309990403.
Gunning, Kazuma, et al., "Design and evaluation of integrity algorithms for PPP in kinematic applications", Proceedings of the 31st International Technical Meeting of the Satellite Division of The Institute of Navigation (ION GNSS+ 2018) Sep. 24-28, 2018, Hyatt Regency Miami, Miami, Florida.
Henkel, Patrick, et al., "Joint L-/C-Band Code and Carrier Phase Linear Combinations for Galileo", International Journal of Navigation and Observation, vol. 2008, Article ID 651437, 8 pages.
Hirokawa, Dr. Rui, "Recent Activity of International Standardization for High-Accuracy GNSS Correction Service", Mitsubishi Electric, Jun. 27, 2019.
Huang, Panpan, "Airborne GNSS PPP Based Pseudolite System", School of Civil and Environmental Engineering Faculty of Engineering UNSW. Jun. 2019.

(56) References Cited

OTHER PUBLICATIONS

Karaim, Malek, et al., "GNSS Error Sources", https://www.intechopen.com/books/multifunctional-operation-and-application-of-gps/gnss-error-sources, published Apr. 6, 2018.

Karaim, Malek, et al., "GPS Cycle Slip Detection and Correction at Measurement Level", British Journal of Applied Science & Technology 4(29): 4239-4251, 2014.

Khanafseh, Samer, et al., "GNSS Multipath Error Modeling for Automotive Applications", Abstract only, Proceedings of the 31st International Technical Meeting of the Satellite Division of The Institute of Navigation (ION GNSS+ 2018), Miami, Florida, Sep. 2018, pp. 1573-1589, https://www.ion.org/publications/abstract.cfm?articleID=16107.

Kilic, Cagri, et al., "ZUPT Aided GNSS Factor Graph with Inertial Navigation Integration for Wheeled Robots", Proceedings of the 34th International Technical Meeting of the Satellite Division of The Institute of Navigation (ION GNSS+ 2021) Sep. 20-24, 2021.

Kissai, Ali, et al., "UAV Dead Reckoning with and without using INS/ GPS Integrated System in GPS denied Polar Region", International Journal of Aeronautics and Aerospace Engineering, ISSN: 2643-8224, 10 pages, published Aug. 26, 2019.

Ko, Jonathan, et al., "GP-UKF: Unscented kalman filters with Gaussian process prediction and observation models", Conference Paper, Dec. 2007, 10.1109/IROS.2007.4399284.

Kuusniemi, Heidi, et al., "GNSS Signal Reliability Testing in Urban and Indoor Environments", Proceedings of NTM 2004 Conference (Session A2), San Diego, CA, Jan. 26-28, 2004, The Institute of Navigation.

Lee, Jae Ho, et al., "A Two-antenna GPS Receiver Integrated with Dead Reckoning Sensors", ION Institute of Navigation, Proceedings of the IAIN Work Congress and the 56th Annual Meeting of the Institute of Navigation, Jun. 26-28, 2000, 4 pages.

Lei, Yu, et al., "Prediction of Navigation Satellite Clock Bias by Gaussian Process Regression", Lecture Notes in Electrical Engineering 342:411-423, Jan. 2015.

Li, T., et al., "Some remarks on GNSS integer ambiguity validation methods", Survey Review, Dec. 5, 2012, vol. 44, No. 326.

Lim, Cheol-Soon, et al., "Feasibility Study on Integration of SSR Correction into Network RTK to Provide More Robust Service", JPNT 7(4), 295-305 (2018).

Lin, Ming, et al., "Robust Gaussian Process Regression for Real-Time High Precision GPS Signal Enhancement", www.gps.gov/systems/gps/performance/accuracy, Jun. 5, 2019.

Liu, Haiying, et al., "A closed-loop EKF and multi-failure diagnosis approach for cooperative GNSS positioning", Engineering, GPS Solutions, Published 2015.

Madrid, Navarro, et al., "New Approach for Integrity Bounds Computation Applied to Advanced Precise Positioning Applications", Proceedings of the 28th International Technical Meeting of the Satellite Division of The Institute of Navigation (ION GNSS+ 2015) Sep. 14-18, 2015, Tampa Convention Center, Tampa, Florida.

Meng, Xiaoli, et al., "A Robust Vehicle Localization Approach Based on GNSS/IMU/DMI/LIDAR Sensor Fusion for Autonomous Vehicles", Sensors, 2017, 17, 2140.

Odijk, Dennis, et al., "On the estimability of parameters in undifferenced, uncombined GNSS network and PPP-RTK user models by means of S-system theory", Journal of Geodesy, Nov. 2015.

Peng, Hao, et al., "Covariance Fusion Strategy of Gaussian Processes Covariance and Orbital Prediction Uncertainty", Conference: AAS/AIAA Astrodynamics Specialist Conference, Portland, ME, Aug. 2019.

Pervan, Boris, et al., "Shaping Aviation Integrity Two RAIMs for Safety", GPS World The Business and Technology of Global Navigation and Positioning, Apr. 1, 2008.

Phelts, R. Eric, et al., "Innovation: Improving ARAIM, An approach using precise point positioning", GPS World, Jun. 13, 2020, https://www.gpsworld.com/innovation-improving-araim/.

Pullen, Sam, "Augmented GNSS: Fundamentals and Keys to Integrity and Continuity", Department of Aeronautics and Astronautics, Stanford University, Stanford, CA 94305-4035 USA, Tuesday, Sep. 20, 2011 1:30-5:00 PM Oregon Convention Center, Portland, Oregon.

Rasmussen, C.E., et al., "Gaussian Processes for Machine Learning", MIT Press, 2006, ISBN 026218253X. c 2006 Massachusetts Institute of Technology, (Year: 2006).

Rodriguez-Solano, Carlos, et al., "Protection Level of the Trimble RTX Positioning Engine for Autonomous Applications", Proceedings of the 34th International Technical Meeting of the Satellite Division of The Institute of Navigation (ION GNSS+ 2021), Sep. 20-24, 2021.

Rothacher, M., et al., "ANTEX: The Antenna Exchange Format, Version 1.4", Sep. 15, 2010, IGC International GNSS Service, https://kb.igs.org/hc/en-us/articles/216104678-ANTEX-format-description.

Bijl, Hildo, et al., "Online sparse Gaussian process regression using FITC and PITC approximations", IFAG—Papers On Line vol. 48, Issue 28, 2015, pp. 703-708 (Year: 2015).

Brocard, Philippe, et al., "System and Method for Distributed Integrity Monitoring", U.S. Appl. No. 18/491,167, filed Oct. 20, 2023.

Cole, D.A., et al., "Locally induced Gaussian processes for large-scale simulation experiments", Stat Comput 31, 33 (2021). https://doi.org/10.1007/s11222-021-10007-9 (Year: 2021).

Erickson, Collin B., et al., "Comparison of Gaussian Process Modeling Software", European Journal of Operational Research 266 (2018) 179-192 (Year: 2018).

Inyurt, Samed, et al., "Ionospheric TEC Forecasting Using Gaussian Process Regression (GPR) and multiple Linear Regression (MLR) in X Turkey", Astrophys Space Sci (2020) 365:99, https://doi.org/10.1007 / s10509-020-03817-2 (Year: 2020).

Lin, Ming, et al., "Robust Gaussian Process Regression for Real-Time High Precision GPS Signal Enhancement", Applied Data Science Track Paper. KDD '19, Aug. 4-8, 2019, Anchorage, AK, USA (Year: 2019).

Parkins, Alex, et al., "System and Method for GNSS Correction Monitoring", U.S. Appl. No. 18/503,662, filed Nov. 7, 2023.

Quinonero-Candel, Joaquin, et al., "A Unifying View of Sparse Approximate Gaussian Progress Regression", Journal of Machine Learning Research 6 (2005) 1939-1959. (Year: 2005).

Smolyakov, Ivan, et al., "System and Method for Determining GNSS Corrections", U.S. Appl. No. 18/241,542, filed Sep. 1, 2023.

Ibrahim, Hassan E., et al., "A Regional Stochastic Model for NOAA-Based Residual Tropospheric Delay", ION NTM 2008, Jan. 28-30, 2008, San Diego, CA.

Wubbena, Gerhard, et al., "RTK Networks based on Geo++ GNSMART—Concepts, Implementation, Results", ION GPS 2001, Sep. 11-14, 2001, Salt Lake City, UT.

Angelo, Joseph, et al., "System and Method for Detecting Outliers in GNSS Obervations", U.S. Appl. No. 18/116,117, filed Mar. 1, 2023.

Roysdon, Paul F., et al., "GPS-INS Outlier Detection & Elimination using a Sliding Window Filter", 2017 American Control Conference (ACC), May 24-26, 2017, Seattle, WA, USA.

Satirapod, Chalermehon, "Improving the GPS Data Processing Algorithm for Precise Static Relative Positioning", School of Surveying and Spatial Information Systems The University of New South Wales. Jan. 2002.

Schmid, R., et al., "Estimation of elevation-dependent satellite antenna phase center variations of GPS satellites", Journal of Geodesy (2003) 77: 440-446, May 19, 2003, DOI 10.1007/s00190-003-0339-0.

Schmid, Ralf, et al., "From Relative Absolute Antenna Phase Center Corrections", Conference: IGS Workshop and Symposium 2004.

Schmid, Ralf, "How to Use IGS Antenna Phase Center Corrections", GPS World Tech Talk, Feb. 3, 2010.

Schmitz, Martin, "RTCM State Space Representation Messages, Status and Plans", PPP-RTK & Open Standards Symposium, Mar. 12-13, 2012, Frankfurt, Germany.

Shapiro, Larry S., et al., "Rejecting Outliers and Estimating Errors in an Orthogonal-Regression Framework", Phil. Trans. R. Soc. Load. A (1995)350, 407-439. (Year:1995).

(56) References Cited

OTHER PUBLICATIONS

Skog, Isaac, et al., "A Low-Cost GPS Aided Inertial Navigation System for Vehicle Applications", 2005 13th European Signal Processing Conference, Sep. 4-8, 2005.

Snelson, Edward, et al., "Sparse Gaussian Process using Pseudo-inputs", NIPS'05: Proceedings of the 18th International Conference on Neural Information Processing Systems, Dec. 2005, pp. 1257-1264.

Subirana, J. Sanz, et al., "Carrier Phase Cycle-Slip Detection—Navipedia", https://gssc.esa.int/navipedia/index.php/Carrier_Phase_Cycle-Slip_Detection, published 2011.

Takasu, Tomoji, et al., "ION GNSS 2008 abstract submission Cycle slip detection and fixing by MEMS IMU/GPS integration for mobile environment RTK-GPS", Tokyo University of Marine Science and Technology, ION GNSS 2008, abstract submission.

Teunissen, P.J.G., "GNSS Integer Ambiguity Validation: Overview of Theory and Methods", Proceedings of the ION 2013 Pacific PNT Meeting, Apr. 23-25, 2013, Marriott Waikiki Beach Resort & Spa, Honolulu, Hawaii, https://www.ion.org/publications/abstract.cfm?articleID=11030.

Teunissen, Peter J.G., et al., "Integer Aperture Estimation A Framework for GNSS Ambiguity Acceptance Testing", InsideGNSS, Mar./Apr. 2011, pp. 66-73, www.insidegnss.com.

Teunissen, P.J.G., "On the GPS widelane and its decorrelating property", Delft Geodetic Computing Centre, Journal of Geodesy (1997) 71: 577-587.

Thombre, Sarang, et al., "GNSS Threat Monitoring and Reporting: Past, Present, and a Proposed Future", The Journal of Navigation, Dec. 2017, DOI: 10.1017/S0373463317000911, https://www.researchgate.net/publication/321663256.

Titsias, Michael K., "Variational Learning of Inducing Variables in Sparse Gaussian Processes", http://proceedings.mlr.press/v5/titsias09a/titsias09a.pdf, 2009.

Urquhart, Landon, "An Analysis of Multi-Frequency Carrier Phase Linear Combinations for GNSS", Department of Geodesy and Geomatics Engineering, University of New Brunswick, Technical Report No. 263, Feb. 2009.

Urquhart, Landon, et al., "Innovation: Integrity for safe navigation", https://www.gpsworld.com/innovation-integrity-for-safe-navigation-provided-by-gnss-service/, GPS World, Feb. 12, 2020.

Van Diggelen, Frank, et al., "Google to improve urban GPS accuracy for apps", Dec. 9, 2020, Android Developers Blog.

Van Graas, Frank, et al., "Precise Velocity Estimation Using a Stand-Alone GPS Receiver", Abstract only, Journal of The Institute of Navigation, vol. 51, No. 4, Winter 2004-2005, pp. 283-292, https://www.ion.org/publications/abstract.cfm?articleID=102384.

Verhagen, S., "The GNSS integer ambiguities: Estimation and validation", Aerospace Engineering, Jan. 31, 2005.

Waserman, Eyal, et al., "A Mixed Integer Least-Squares Formulation of the GNSS Snapshot Positioning Problem", https://github.com/eyalw711/snapshot-positioning, Jun. 2, 2021.

Wubbena, Gerhard, et al., "PPP-RTK: Precise Point Positioning Using State-Space Representation in RTK Networks", Presented at the 18th International Technical Meeting, ION GNSS-05, Sep. 13-16, 2005, Long Beach, California.

Yang, Wenhao, et al., "An Improved Relative GNSS Tracking Method Utilizing Single Frequency Receivers", Sensors 2020, 20, 4073; doi:10.3390/s20154073 www.mdpi.com/journal/sensors, 19 pages.

Zair, Salim, et al., "Outlier Detection in GNSS Pseudo-Range/Doppler Measurements for Robust Localization", Sensors 2016, 16, 580; doi:10.3390/s16040580, www.mdpi.com/journal/sensors.

Zhu, Ni, et al., "GNSS Position Integrity in Urban Environments: A Review of Literature", IEEE Transactions on Intelligent Transportation Systems, 2018, 17p., 10.1109/TITS.2017.2766768.hal-01709519.

\* cited by examiner

SYSTEMS AND METHODS FOR REDUCED-OUTLIER SATELLITE POSITIONING

CROSS-REFERENCE TO RELATED APPLICATIONS

This application is a continuation of U.S. patent application Ser. No. 16/748,517 filed on 21 Jan. 2020, which is a continuation of U.S. patent application Ser. No. 16/219,119 filed 13 Dec. 2018, which claims the benefit of U.S. Provisional Application Ser. No. 62/598,826, filed on 14 Dec. 2017, each of which is incorporated in its entirety by this reference.

TECHNICAL FIELD

This invention relates generally to the satellite positioning field, and more specifically to new and useful systems and methods for reduced-outlier satellite positioning.

BACKGROUND

Being able to perform high precision satellite positioning is important for a wide variety of applications. Unfortunately, current GPS solutions are often either inaccurate or require processor power beyond the capabilities of inexpensive hardware (either locally or in the cloud). A number of solutions have been proposed to address this problem, including Precise Point Positioning (PPP) and Real Time Kinematic (RTK) satellite positioning. However, all satellite positioning solutions are made less efficient by noise in receiver observations. Therefore, there is the need in the satellite positioning field to create systems and methods for reduced-outlier satellite positioning. This invention provides such new and useful systems and methods.

DESCRIPTION OF THE INVENTION EMBODIMENTS

Figure 1:
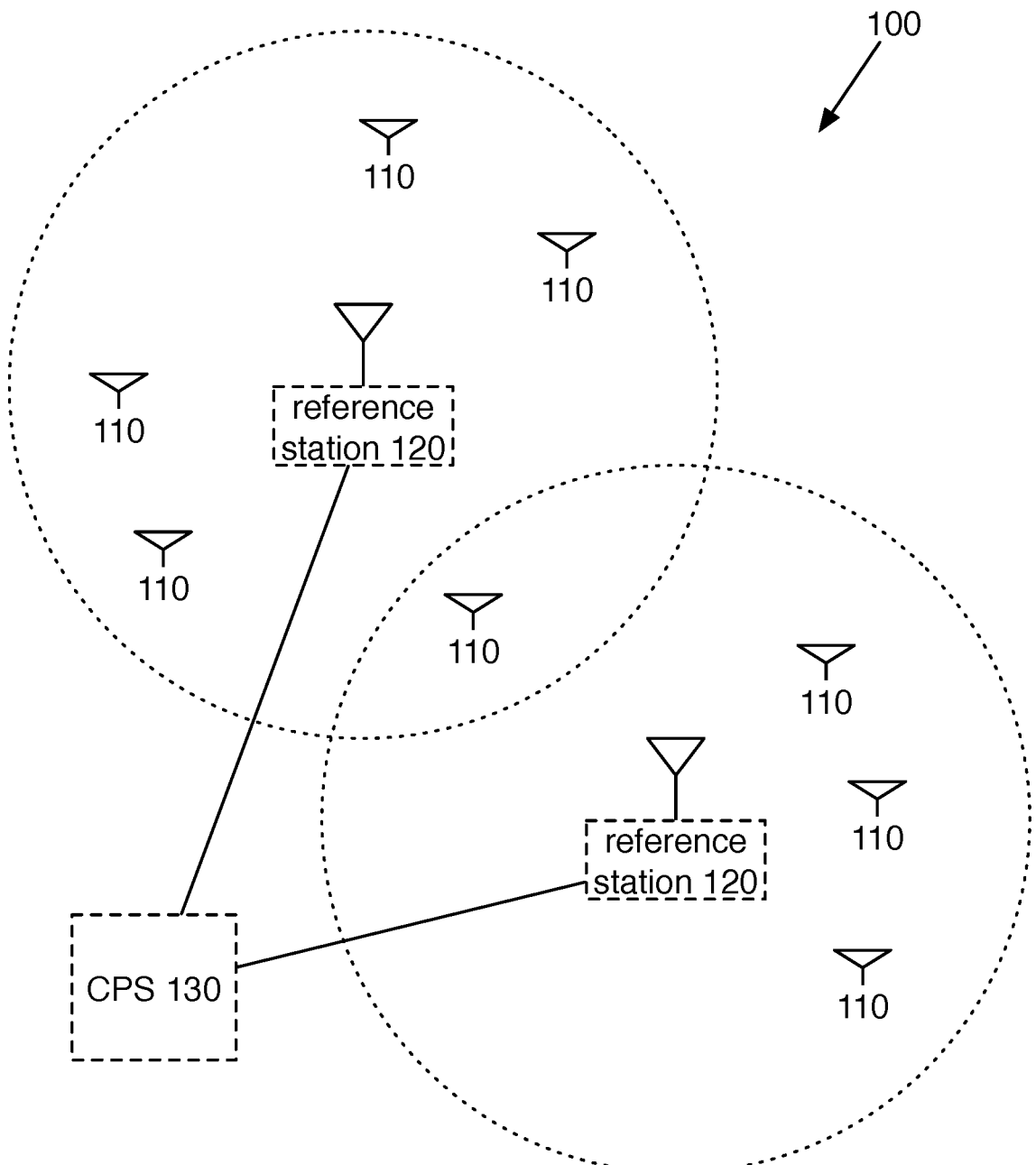
FIG. 1 is a diagram representation of a system of an invention embodiment.

The following description of the invention embodiments of the invention is not intended to limit the invention to these invention embodiments, but rather to enable any person skilled in the art to make and use this invention.

1. Traditional GNSS, PPP, and RTK

Traditional satellite positioning systems (e.g., standard GNSS) work by attempting to align a local copy (at a receiver) of a pseudorandom binary sequence with a satellite-transmitted copy of the same sequence; because the satellite is far from the receiver, the signal transmitted by the satellite is delayed. By delaying the local copy of the sequence to match up with the satellite-transmitted copy, the time it takes the signal to travel from the satellite to the receiver can be found, which can in turn be used to calculate the distance between the satellite and receiver. By performing this process for multiple satellites (typically four or more), a position of the receiver relative to the satellites can be found, which can in turn be used to find the position in a particular geographic coordinate system (e.g., latitude, longitude, and elevation). Typical GNSS systems can achieve at best 2 m accuracy in positioning.

For many applications (e.g., guidance for human-carrying autonomous vehicles/drones/agricultural equipment, GPS/GNSS research, surveying), this level of accuracy is woefully inadequate. In response, two position correction algorithms have been developed: precise point positioning (PPP) and real time kinematic (RTK).

Instead of solely using the pseudo-code broadcast by satellites, PPP and RTK also make use of satellite signal carrier phase to determine position. While much higher accuracy is possible using carrier phase data, accurately determining position of a mobile receiver (i.e., the receiver for which position is to be calculated) requires accounting for a number of potential sources of error. Further, carrier phase measurements are ambiguous; because the carrier signal is uniform, it may not be possible to differentiate between a phase shift of $\varphi$ and $2\pi N+\varphi$ using phase measurements alone, where N is an integer. For example, it may be difficult to determine the difference between a phase shift of $\pi$ radians and a phase shift of $3\pi$ radians (or $-\pi$, $5\pi$, etc.).

PPP attempts to solve this issue by explicitly modeling the error present in mobile receiver phase and code measurements. Some errors are global or nearly global (e.g., satellite orbit and clock errors); for these errors, PPP typically uses correction data with highly accurate measurements. However, for local errors (i.e., error that is substantially dependent on mobile receiver location), PPP is only capable of very rough modeling. Fortunately, many local errors change slowly in time; resultantly, PPP can achieve high accuracy with only a single receiver, but may require a long startup time to precisely determine local errors.

RTK avoids a large majority of the modeling present in PPP by use of GNSS reference stations (with precisely known locations); since a reference station is local to the mobile receiver, differencing the reference station and mobile receiver signals can result in greatly reduced error. The result is that RTK solutions can converge much more quickly than PPP solutions (and without the high accuracy global corrections data needed by PPP). However, RTK solutions require the presence of base stations near a mobile receiver.

For all three of these positioning solutions, the presence of corrupted or otherwise inaccurate observation data (either at a receiver or as an input for corrections generation) has the potential to reduce solution accuracy and efficiency (in particular, the presence of outlier data may increase convergence time for a given solution).

The systems and methods of the present disclosure are directed to the removal of inaccurate observation data in satellite positioning techniques, in turn increasing accuracy, efficiency, and/or any other metric of positioning performance (e.g., accuracy of corrections data).

2. Reduced-Outlier Satellite Positioning System

As shown in FIG. 1, a reduced-outlier satellite positioning system 100 includes a mobile receiver no. The system 100 may additionally include reference stations 120 and/or a central processing server 130.

The system 100 functions to estimate the position of the mobile receiver 110 with high accuracy. The system 100 preferably functions to perform satellite positioning using a novel form of outlier mitigation (described in more detail in the section on the method 200). Mobile receivers no of the system 100 are preferably able to achieve centimeter-level relative positioning while maintaining a small form factor, low cost, and low power consumption. The advantages in accuracy, size, cost, and power consumption preferably enable mobile receivers no to be used in applications where previous GNSS solutions were not accurate enough, too large, too expensive, and/or too power hungry. Applications that may be of particular interest to purchasers of mobile receivers no include autonomous vehicle guidance (e.g., for UAVs or agricultural equipment), GPS/GNSS research, and surveying systems. Additionally, the mobile receivers no may be designed to utilize open-source firmware, allowing them to be easily customized to particular demands of end user applications, easing system integration and reducing host system overhead.

The mobile receiver no functions to calculate position data (e.g., pseudo-range, phase) that can be used to calculate the position of the mobile receiver no.

Figure 2:
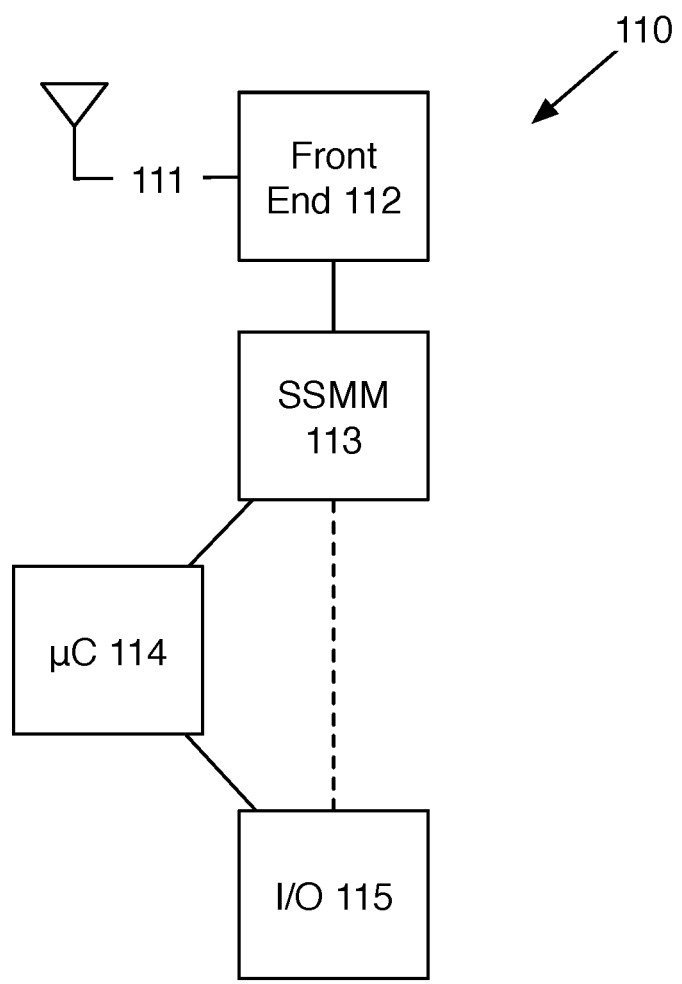
FIG. 2 is a diagram representation of a mobile receiver of a system of an invention embodiment.

As shown in FIG. 2, the mobile receiver no preferably includes an antenna coupler in, a front-end module 112, a satellite signal management module 113, a microcontroller 114, and an input/output module 115.

The antenna coupler 111 functions to couple a satellite signal-ready antenna to the mobile receiver 110 (additionally or alternatively, the mobile receiver 110 may include an antenna, such as a patch antenna).

Antennas coupled by and/or included with the antenna coupler 111 are preferably made out of a conductive material (e.g., metal). The antennas may additionally or alternatively include dielectric materials to modify the properties of the antennas or to provide mechanical support.

The antennas may be of a variety of antenna types; for example, patch antennas (including rectangular and planar inverted F), reflector antennas, wire antennas (including dipole antennas), bow-tie antennas, aperture antennas, loop-inductor antennas, and fractal antennas. The antennas can additionally include one or more type of antennas, and the types of antennas can include any suitable variations. The antenna structure may be static or dynamic (e.g., a wire antenna that includes multiple sections that may be electrically connected or isolated depending on the state of the antenna). Antennas may have isotropic or anisotropic radiation patterns (i.e., the antennas may be directional). If antennas are directional, their radiation pattern may be dynamically alterable; for example, an antenna substantially emitting radiation in one direction may be rotated so as to change the direction of radiation.

If the antenna coupler 111 couples to multiple antennas, the antenna coupler 111 may split power between them using a splitter; additionally or alternatively, the antenna coupler 111 may include a switch to select between the multiple antennas, or the antenna coupler 111 may couple to the antennas in any suitable manner.

The front-end module 112 functions to convert signals received by the antenna coupler 111 to digital baseband signals for processing. The front-end module 112 includes an analog-to-digital converter (e.g., the Maxim MAX2769) capable of operating at high sample rates. The front-end module 112 is preferably capable of receiving L1 GPS, GLONASS, Galileo, and SBAS signal bands. The front-end module 112 may additionally or alternatively be capable of receiving additional bands (e.g., L2 GPS) or the mobile receiver 110 may include multiple front-end modules 112 for different bands.

The satellite signal management module 113 functions to perform satellite signal tracking and acquisition. The satellite signal management module 113 may additionally or alternatively include programmable digital notch filters for performing continuous wave noise nulling. The satellite signal management module preferably includes flexible and fully programmable correlators that may be used by the microcontroller 114 to implement tracking loops and acquisition algorithms. The satellite signal management module 113 is preferably implemented on an FPGA, allowing the firmware to be altered to enable adaptation of the mobile receiver 110 to various applications. Additionally or alternatively, the satellite signal management module 113 may be implemented by any suitable circuit.

The microcontroller 114 functions to perform signal processing above the correlator level on the mobile receiver 110 (e.g., tracking loop filters, acquisition management, navigation processing, etc.). The microcontroller 114 additionally or alternately manages communication over the input/output module 115. The microcontroller 114 preferably is able to calculate position, velocity, time (PVT) solutions at a rate of 50 Hz or higher, but may additionally or alternatively calculate PVT solutions at any rate.

The input/output module 115 functions to allow for data to be transmitted from or received by the mobile receiver no. The input/output module 115 is preferably used to couple the mobile receiver no to a UHF radio modem, so that the mobile receiver no may receive reference station 120 correction signals over the UHF radio modem. The input/output module 115 may additionally or alternatively be used for any other suitable transmission or reception of data from the mobile receiver no (e.g., the mobile receiver no may transmit raw navigation data over the input/output module 115 to a control computer on a UAV, or the mobile receiver no may transmit data through a Bluetooth or cellular modem connected to the input/output module 115). The input/output module 115 preferably includes one or more UART connections, but may additionally or alternatively include connections for any other suitable input/output communications; for example, the input/output module 115 may include a USB port.

The reference stations 120 function to transmit phase data of signals received at the reference stations 120 (or other data useful for positioning correction). The reference stations 120 utilized by the system 100 are preferably public reference stations, but may additionally or alternatively be private reference stations or any other reference stations.

Reference stations 120 preferably have a location known to a high degree of accuracy. Reference station 120 location is preferably the location of the antenna used to receive satellite signals. Reference station 120 location may be determined in any manner yielding a high degree of accuracy; for example, reference station 120 location may be determined by a number of single frequency carrier phase receivers set around the reference station 120 at vertical and horizontal reference points. Note that while reference stations 120 are preferably fixed in location, they may additionally or alternatively be mobile. Station position is preferably re-determined to high accuracy before moved reference stations 120 re-start providing phase data; additionally or alternatively, reference stations 120 may provide phase data before location re-determination (for example, for use in attitude estimation). As another alternative, reference stations 120 may not provide absolute location data at all if not needed; for example, absolute location data of the reference station 120 may not be needed for applications including attitude estimation.

Reference stations 120 preferably provide phase data for multiple satellite signals and the location of the reference station via the internet, but may additionally or alternatively provide data by any other suitable method (e.g., transmission by UHF-band radio modem). Reference station 120 data is preferably made available directly to mobile receivers 120, but may additionally or alternatively be processed or aggregated before being made available to mobile receivers 120.

In one variation of a preferred embodiment, data from multiple reference stations 120 is combined at a server (e.g., the central processing server 130); the server uses the reference station 120 data to create a virtual reference station. Error in relative positioning of a mobile receiver no increases with the distance from the reference station 120. By comparing data from multiple reference stations 120, distance-dependent systematic errors (e.g., those caused by ionospheric and tropospheric refractions or satellite orbit errors) can be modeled more precisely. The server can then use these error models to predict the reference data that would be transmitted by a reference station near the mobile receiver 110; from this prediction, data from a 'virtual reference station' with a location near the mobile receiver 110 can be transmitted to the mobile receiver no and used to increase mobile receiver no positioning accuracy.

The central processing server 130 functions to process data from reference stations 120 and mobile receivers no. The central processing server 130 may process this data for multiple purposes, including aggregating position data (e.g., tracking multiple mobile receivers 110), system control (e.g., providing flight directions to a UAV based on position data received from a mobile receiver no attached to the UAV), and/or position calculation (e.g., performing calculations for mobile receivers no that are offloaded due to limited memory or processing power). The central processing server 130 may additionally or alternatively process data to perform all or part of the outlier reduction steps of the method 200. The central processing server 130 may additionally or alternatively manage reference stations 120 or generate virtual reference stations for mobile receiver no based on reference station 120 data. The central processing server 130 may additionally or alternatively serve as an internet gateway to mobile receiver no data if mobile receivers no are not internet connected directly. The central processing server 130 is preferably an internet-connected general-purpose computer, but may additionally or alternatively comprise any suitable hardware.

3. Method

Figure 3:
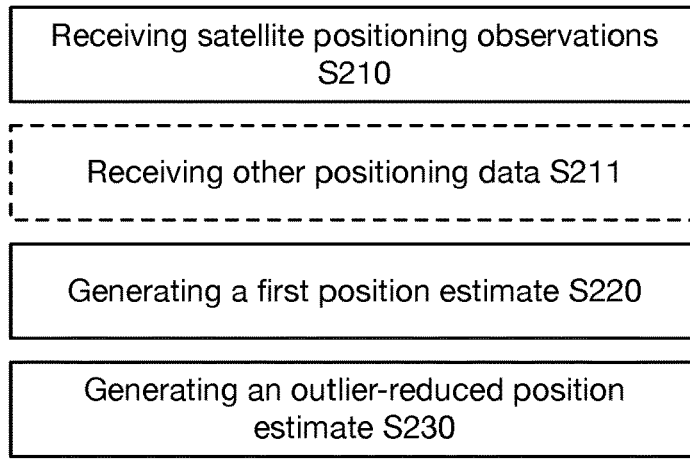
FIG. 3 is a chart representation of a method of an invention embodiment.
Figure 4:
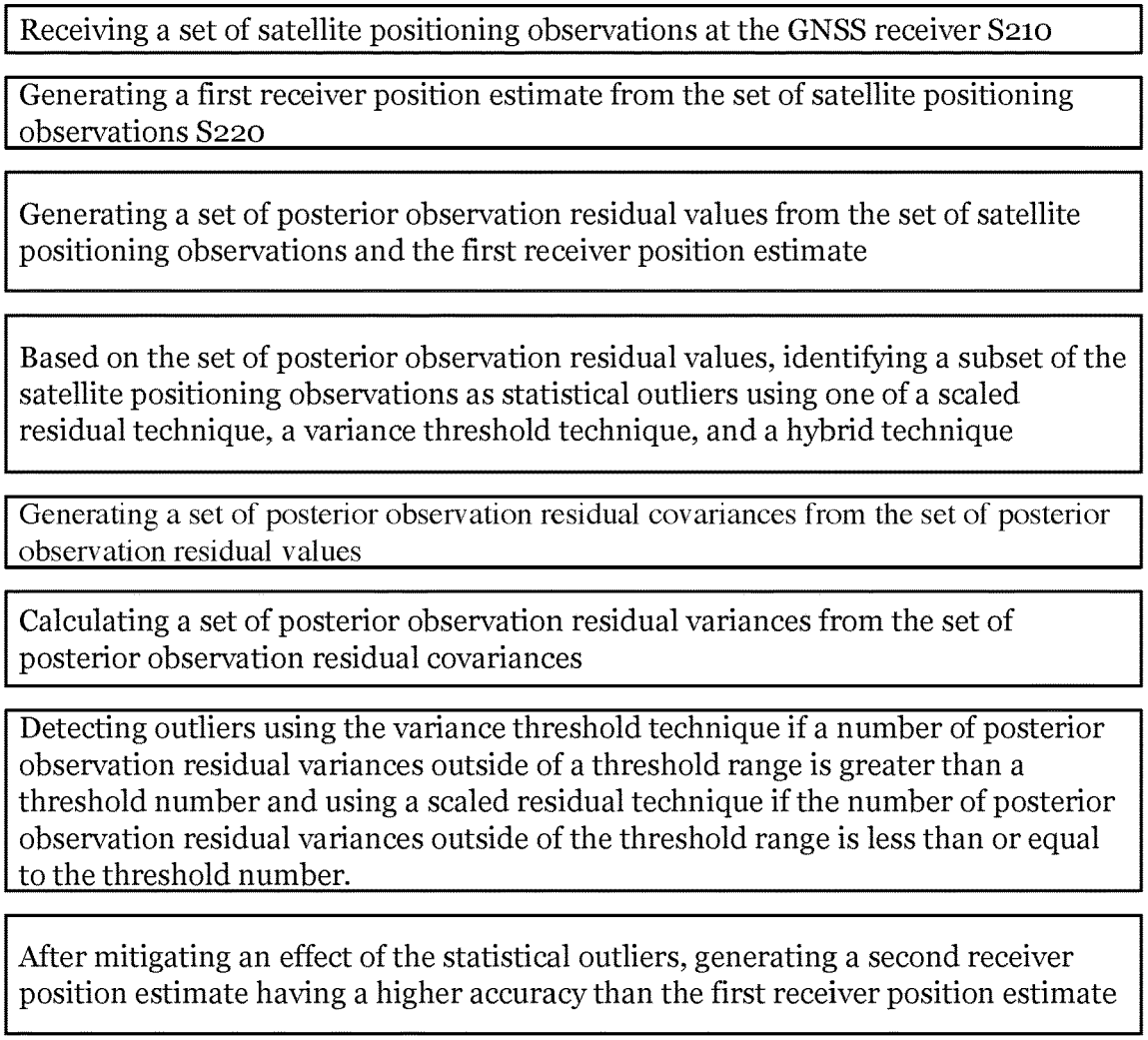
FIG. 4 is a chart representation of an embodiment of the invention using a hybrid technique to identify statistical outliers.

A method 200 for reduced-outlier satellite positioning includes receiving satellite positioning observations S210, generating a first receiver position estimate S220, and generating an outlier-reduced second receiver position estimate S230, as shown in FIG. 3. The method 200 may additionally or alternatively include receiving other positioning data S211.

The method 200 functions to utilize one of three techniques to detect erroneous observations in satellite positioning data (described in the section on S230) and remove the erroneous observations to improve positioning accuracy.

S210 includes receiving satellite positioning observations. S210 functions to receive (at a mobile receiver or at any other computer system) satellite data that can be used to calculate the position of the mobile receiver (potentially along with correction data). Satellite data preferably includes pseudo-range and phase observations at the mobile receiver, but may additionally or alternatively include any data useful for satellite positioning (e.g., positioning code data). The observations received in S210 may be of any number of satellites at any time(s). Pseudo-range and phase observations are preferably derived from navigation receiver carrier signals at the L1 frequency (1575.42 MHz), but may additionally or alternatively be received at the L2 frequency (1227.60 MHz) or any other suitable frequency. Navigation satellite carrier signals received in Step S210 may include GPS signals, GLONASS signals, Galileo signals, SBAS signals and/or any other suitable navigation signal transmitted by a satellite.

If receiver carrier signals are received at both L1 and L2 frequencies, Step S210 may include combining the L1 and L2 frequency signals for each satellite to create a beat signal. Alternatively, any other linear combination of signals from any frequency bands may be formed. The resulting signal (i.e., the beat signal) has a center frequency significantly lower than either the L1 or L2 signals (~347.82 MHz), which allows for a smaller set of possible integer ambiguity values for a given prior (e.g., if $|N|\leq 10$ for an L1 signal, $|N|\leq 2$ for the example beat signal). The resulting signal may additionally or alternatively possess other desirable properties (e.g., reduction in ionospheric error).

S210 is preferably performed initially at the mobile receiver, but S210 may additionally include transmitting data (e.g., phase, pseudo-range, receiver specific corrections data) from the mobile receiver to a remote computer (e.g., a computer at a reference station, a cloud computing server, another mobile receiver). Alternatively, S210 may be performed at any computer system.

S211 includes receiving other positioning data. S211 functions to receive additional data used for positioning in addition to satellite data. For example, S211 may include receiving inertial data from an inertial measurement unit (IMU), accelerometer, and/or gyroscope that may be useful in calculating receiver position more accurately. As a second example, S211 may include receiving data from a speedometer, odometer, or other position/speed/acceleration measuring source at the mobile receiver. As a third example, S211 may include receiving data concerning receiver position from an external source (e.g., an optical camera system tracking the mobile receiver or an object coupled to the mobile receiver).

Like S210, S211 is preferably performed initially at the mobile receiver (except in the case of externally sourced data), but S211 may additionally include transmitting data (e.g., phase, pseudo-range, receiver specific corrections data) from the mobile receiver to a remote computer (e.g., a computer at a reference station, a cloud computing server, another mobile receiver). Alternatively, S211 may be performed at any computer system.

S220 includes generating a first receiver position estimate. S220 functions to generate an estimate of the receiver position using the observations received in S210 (and potentially prior observations as well).

S220 preferably includes generating an estimate of the receiver position in absolute Cartesian coordinates, but may additionally or alternatively include generate the receiver position estimate using any coordinate system.

S220 preferably includes generating the first receiver position estimate using a Kalman filter (or another filter that estimates receiver state based on a time series of noisy measurements), but may additionally or alternatively include generating the first receiver position estimate in any manner. For sake of convenience, the mathematical expressions that follow are given with respect to a Kalman filter, but it is understood that the concepts embodied by these expressions may be adapted to other techniques for generating position estimates.

The observations received in S210 may be formatted for position estimate generation as follows:

$$z_k = H_k x_k + n_k$$

where $z_k$ is the measurement at time (or step) k, $x_k$ is the true state, $n_k$ is observation noise (zero mean and with known covariance), and $H_k$ is the observation model that maps the true state space into the observed space. The Kalman filter model further assumes that there is a relationship between states at different times given by $$x_k = F_k x_{k-1} + w_k$$

where $w_k$ is process noise (also zero mean and with known covariance) and $F_k$ is the transition model that maps true state at time k−1 to true state at time k.

The observation vector z preferably includes pseudo-range and phase measurements, related to range (i.e., distance between the receiver and a given satellite) as follows:

$$\rho = r + I + \epsilon_\rho$$

$$\phi = \frac{r}{\lambda} + \frac{I}{\lambda} + \epsilon_\phi$$

The state vector x preferably includes receiver position (e.g., x, y, z), and may additionally include other calculated estimates (e.g., phase ambiguity, ionospheric error terms, etc.).

The position estimate of S220 is preferably calculated by any number of prediction and update steps based on the observations received in S210. For example, S210 may include receiving observations at different times, and S220 may include generating a position estimate using all of those observations and a previous position estimate. Alternatively, S220 may include generating a position estimate from only a subset of the observations.

S230 includes generating an outlier-reduced second receiver position estimate. S230 functions to detect the effect of erroneous observations (i.e., erroneous observations detectable as statistical outliers) in the first receiver position estimate and modify the position estimate to increase accuracy (generating the second receiver position estimate, characterized by higher performance).

While techniques for removing or weighting measurement outliers exist in the prior art (as well as analysis of solution or measurement quality based on residuals), S230 includes specific techniques that may more efficiently mitigate the effect of outliers than existing techniques. For example, while techniques exist for mitigating for a single outlier at a time, the techniques of S230 may lend themselves to identifying and/or mitigating for multiple outliers in parallel.

S230 preferably detects outlier observations using one of the three following techniques (scaled residual technique, variance threshold technique, and hybrid technique). After detecting outlier observations, S230 preferably includes generating the second position estimate in the same manner as in S220, but excluding any outlier observations. Additionally or alternatively, S230 may include generating the second position estimate by adding new observations with negative variances as updates to the first position estimate (the new observations serving to remove the effects of detected outlier observations), or in any other manner. While these are two examples of how S230 may mitigate effects of outliers on position estimates, S230 may additionally or alternatively accomplish this in any manner (e.g., weighting non-outlier observations more strongly than outlier observations).

Scaled Residual Technique

In a first implementation of an invention embodiment, S230 includes generating an outlier-reduced second receiver position estimate using the scaled residual technique described in this section. Note that the term "scaled residual technique" is here coined to refer to exactly the technique described herein (any similarity in name to other techniques is purely coincidental).

In the scaled residual technique, S230 preferably includes calculating posterior residual values for the satellite data observations. That is, for observations $z_k$ and posterior state estimate $\hat{x}_{k|k}$ (calculated in S220), S230 preferably includes calculating the residual $$\tilde{v}_{k|k} = z_k - H_k \hat{x}_{k|k}$$

henceforth referred to as the posterior observation residual (sometimes referred to as the measurement post-fit residual). From the posterior observation residual, S230 preferably includes calculating the posterior observation residual covariance, $$C_k = R_k - H_k P_{k|k} H_k^T$$

where $R_k$ is the covariance of $n_k$ and $P_{k|k}$ is the updated state covariance.

From the posterior observation residual covariance, the variance of the posterior observation residual vector can be calculated:

$$\sigma^2 = \frac{v^T R_k^{-1} v}{DOF}$$

where DOF is degrees of freedom. Note that v may be written as Sz where S is an matrix having a trace equivalent to the DOF. From this, it can be said that $$S = I - H_k P_{k|k} H_k^T R_k^{-1}$$

Finally, this variance can be used to scale the residuals $\tilde{v}_{k|k}$ (e.g., by dividing residuals by their associated standard deviations or by their associated variances). The scaled residuals are then compared to a threshold window (e.g., one corresponding to plus or minus 3 standard deviations from the mean), and any observations falling outside the threshold window are flagged as outlier observations.

The second receiver position state is then generated from the reduced set of observations as described previously.

Variance Threshold Technique

In a second implementation of an invention embodiment, S230 includes generating an outlier-reduced second receiver position estimate using the variance threshold technique described in this section. Note that the term "variance threshold technique" is here coined to refer to exactly the technique described herein (any similarity in name to other techniques is purely coincidental).

In the variance threshold technique, the posterior residual, posterior residual covariance, and posterior residual variance are calculated as in the scaled residual technique. However, in this technique, the posterior residual variances are examined directly. If one or more posterior residual variances is outside of a threshold range, this is an indication that outliers may be present in the observation data.

In this technique, S230 preferably includes removing a set of observations and recalculating the posterior residual variances. If the posterior residual variances fall below threshold levels, the algorithm may stop here; however, the algorithm may alternatively try removing a different set of observations (and so on, until at least one or more of them falls below threshold levels). Alternatively stated, the algorithm may continue until the number of posterior residual variances outside of a threshold range is less than a threshold number.

Alternatively, in this technique, S230 may include calculating posterior residual variances for a number of set-reduced observations (i.e., different subsets of the whole set of observations) and choosing the reduced set with the lowest variance.

This technique may be particularly useful for differenced measurements. Differenced measurements are correlated, and thus more likely to result in an outlier in one observation corrupting residuals that correspond to different observations.

The second receiver position state is then generated from the reduced set of observations as described previously.

Hybrid Technique

In a third implementation of an invention embodiment, S230 includes generating an outlier-reduced second receiver position estimate using the hybrid technique described in this section. Note that the term "hybrid technique" is here coined to refer to exactly the technique described herein (any similarity in name to other techniques is purely coincidental).

In the hybrid technique, the posterior residual, posterior residual covariance, and posterior residual variance are calculated as in the scaled residual technique. Then, the posterior residual variances are examined. If one or more posterior residual variances is above a threshold (note: this can be a different threshold than the one mentioned in the variance threshold technique), S230 includes detecting outliers using the variance threshold technique; however, if not, S230 includes detecting outliers using the scaled residual technique. Additionally or alternatively, S230 may include selecting between the variance threshold and scaled residual techniques in any manner based on the number of above-threshold posterior residual variances and/or their magnitude.

The second receiver position state is then generated from the reduced set of observations as described previously.

All three of these techniques preferably treat phase ambiguity as a continuous variable; however, S230 may additionally or alternatively attempt to constrain phase ambiguity to an integer. For example, S230 may include (e.g., after calculating a second position estimate) calculating phase measurement residuals and comparing those residuals to integer multiples of full phase cycles (e.g., $2\pi n$). If the residual is close, this may be indicative of a cycle slip, rather than an erroneous observation.

In one implementation of an invention embodiment, S230 includes detecting a potential cycle slip, verifying that the value of the cycle slip can be chosen reliably (e.g., by verifying that only a single integer cycle slip value is contained within a known window of variance around the value of the residual), and testing the cycle slip value against the residual (e.g., by verifying that the cycle slip value is within a window of variance of the residual value). Note that the two windows of variance described here may be distinct (e.g., one may be smaller than the other). S230 may then include correcting for the cycle slip.

Note that if the method 200 identifies data from one or more sources (e.g., satellites, base stations) as erroneous, the method 200 may include flagging or otherwise providing notification that said sources may be "unhealthy". Further, the method 200 may disregard or weight differently observations from these sources.

The method 200 is preferably implemented by the system 100 but may additionally or alternatively be implemented by any system for processing of satellite position data.

The methods of the preferred embodiment and variations thereof can be embodied and/or implemented at least in part as a machine configured to receive a computer-readable medium storing computer-readable instructions. The instructions are preferably executed by computer-executable components preferably integrated with a system for outlier-reduced processing of satellite position data. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

As a person skilled in the art will recognize from the previous detailed description and from the figures and claims, modifications and changes can be made to the preferred embodiments of the invention without departing from the scope of this invention defined in the following claims.

We claim:

1. A method for reduced-outlier satellite positioning of a Global Navigation Satellite System (GNSS) receiver comprising:
   receiving a set of satellite positioning observations at the GNSS receiver;
   generating a first receiver position estimate from the set of satellite positioning observations;
   generating a set of posterior observation residual values from the set of satellite positioning observations and the first receiver position estimate;
   based on the set of posterior observation residual values, identifying a subset of the satellite positioning observations as statistical outliers using a scaled residual technique comprising:
      calculating a set of posterior observation residual variances from the set of posterior observation residual covariances;
      scaling the set of posterior observation residual values using the set of posterior observation residual variances; and
      identifying at least one satellite positioning observation as a statistical outlier based on a corresponding scaled posterior observation residual value being outside a threshold range;
   mitigating an effect of the statistical outliers; and
   after mitigating an effect of the statistical outliers, generating a second receiver position estimate having higher accuracy than the first receiver position estimate, wherein the higher accuracy is a result of mitigating the effect of the statistical outliers.

2. The method of claim 1, wherein the threshold range is centered on a mean of the set of scaled posterior observation residual values; wherein a size of the threshold range is set based on a distribution of the set of scaled posterior observation residual values.

3. The method of claim 1, wherein mitigating the effect of the statistical outliers comprises removing the statistical outliers from the set of satellite positioning observations to create a reduced-outlier set of satellite positioning observations, and generating the second receiver position estimate from the reduced-outlier set of satellite positioning observations.

4. The method of claim 1, wherein mitigating the effect of the statistical outliers comprises generating new observations having negative variances and adding the new observations as updates to the first receiver position estimate.

5. The method of claim 1, further comprising: detecting that the statistical outlier observation is a cycle slip by verifying that only a single integer cycle slip value is contained within a first threshold range of variance around the statistical outlier observation and verifying that the single integer cycle slip value is contained within a second threshold range of variance around the statistical outlier observation; and correcting the statistical outlier observation based on the cycle slip detection.

6. The method of claim 5, wherein the second threshold range is smaller than the first threshold range.

7. The method of claim 1, wherein identifying the subset of the satellite positioning observations as statistical outliers further comprises using a variance threshold technique; wherein using the variance threshold technique comprises:

generating a set of posterior observation residual covariances from the set of posterior observation residual values;

calculating a second set of posterior observation residual variances from the set of posterior observation residual covariances;

identifying a presence of statistical outliers in the set of satellite positioning observations based on a first number of the second set of posterior observation residual variances being outside a threshold range;

generating a first reduced set of satellite positioning observations by removing a first subset of the set of satellite positioning observations;

recalculating the second set of posterior observation residual variances using the first reduced set of satellite positioning observations;

determining that a number of the set of recalculated posterior observation residuals outside the threshold range is lower than the first number; and in response to this determination, identifying a subset of the set of satellite positioning observations as statistical outliers.

8. The method of claim 7, wherein identifying the subset of the satellite positioning observations as statistical outliers comprises generating additional reduced sets of satellite positioning observations and testing these additional reduced sets until one of the additional reduced sets is determined to have a number of posterior residual variances outside of the threshold range lower than a threshold number.

9. The method of claim 7, wherein identifying the subset of the satellite positioning observations as statistical outliers comprises generating additional reduced sets of satellite positioning observations and selecting an additional reduced set with a lowest variance of the additional reduced sets; wherein identifying a subset of the set of satellite positioning observations as statistical outliers comprises identifying the subset based on the selected additional reduced set.

10. The method of claim 7, wherein the threshold range is centered on a mean of the set of posterior observation residual values; wherein a size of the threshold range is set based on a distribution of the set of posterior observation residual values.

11. The method of claim 7, wherein mitigating the effect of the statistical outliers comprises removing the statistical outliers from the set of satellite positioning observations to create a reduced-outlier set of satellite positioning observations, and generating the second receiver position estimate from the reduced-outlier set of satellite positioning observations.

12. The method of claim 7, wherein mitigating the effect of the statistical outliers comprises generating new observations having negative variances and adding the new observations as updates to the first receiver position estimate.

13. The method of claim 7, further comprising:

detecting that a statistical outlier observation is a cycle slip by verifying that only a single integer cycle slip value is contained within a first threshold range of variance around the statistical outlier observation and verifying that the single integer cycle slip value is contained within a second threshold range of variance around the statistical outlier observation; and correcting the statistical outlier observation based on the cycle slip detection.

14. The method of claim 13, wherein the second threshold range is smaller than the first threshold range.

15. A method for reduced-outlier satellite positioning of a Global Navigation Satellite System (GNSS) receiver comprising:

receiving a set of satellite positioning observations at the GNSS receiver;

generating a first receiver position estimate from the set of satellite positioning observations;

generating a set of posterior observation residual values from the set of satellite positioning observations and the first receiver position estimate;

based on the set of posterior observation residual values, identifying a subset of the satellite positioning observations as statistical outliers using one a variance threshold technique comprising:

generating a set of posterior observation residual covariances from the set of posterior observation residual values;

calculating a set of posterior observation residual variances from the set of posterior observation residual covariances;

identifying a presence of statistical outliers in the set of satellite positioning observations based on a first number of the set of posterior observation residual variances being outside a threshold range;

generating a first reduced set of satellite positioning observations by removing a first subset of the set of satellite positioning observations;

recalculating the set of posterior observation residual variances using the first reduced set of satellite positioning observations;

determining that a number of the set of recalculated posterior observation residuals outside the threshold range is lower than the first number; and in response to this determination, identifying a subset of the set of satellite positioning observations as statistical outliers;

mitigating an effect of the statistical outliers; and after mitigating an effect of the statistical outliers, generating a second receiver position estimate having higher accuracy than the first receiver position estimate, wherein the higher accuracy is a result of mitigating the effect of the statistical outliers.

16. The method of claim 15, wherein identifying the subset of the satellite positioning observations as statistical outliers comprises generating additional reduced sets of satellite positioning observations and testing these additional reduced sets until one of the additional reduced sets is determined to have a number of posterior residual variances outside of the threshold range lower than a threshold number.

17. The method of claim 15, wherein identifying the subset of the satellite positioning observations as statistical outliers comprises generating additional reduced sets of satellite positioning observations and selecting an additional reduced set with a lowest variance of the additional reduced sets; wherein identifying a subset of the set of satellite positioning observations as statistical outliers comprises identifying the subset based on the selected additional reduced set.

18. The method of claim 15, wherein the threshold range is centered on a mean of the set of posterior observation residual values; wherein a size of the threshold range is set based on a distribution of the set of posterior observation residual values.

19. The method of claim 15, wherein mitigating the effect of the statistical outliers comprises removing the statistical outliers from the set of satellite positioning observations to create a reduced-outlier set of satellite positioning observations, and generating the second receiver position estimate from the reduced-outlier set of satellite positioning observations.

20. The method of claim 15, wherein mitigating the effect of the statistical outliers comprises generating new observations having negative variances and adding the new observations as updates to the first receiver position estimate.

21. The method of claim 15, further comprising:
  detecting that a statistical outlier observation is a cycle slip by verifying that only a single integer cycle slip value is contained within a first threshold range of variance around the statistical outlier observation and verifying that the single integer cycle slip value is contained within a second threshold range of variance around the statistical outlier observation; and
  correcting the statistical outlier observation based on the cycle slip detection.

22. The method of claim 21, wherein the second threshold range is smaller than the first threshold range.

\* \* \* \* \*